Dec. 4, 1928. 1,693,914
A. U. AVERA
TRANSMISSION OF POWER TO VEHICLES
Original Filed July 13, 1922  2 Sheets-Sheet 1
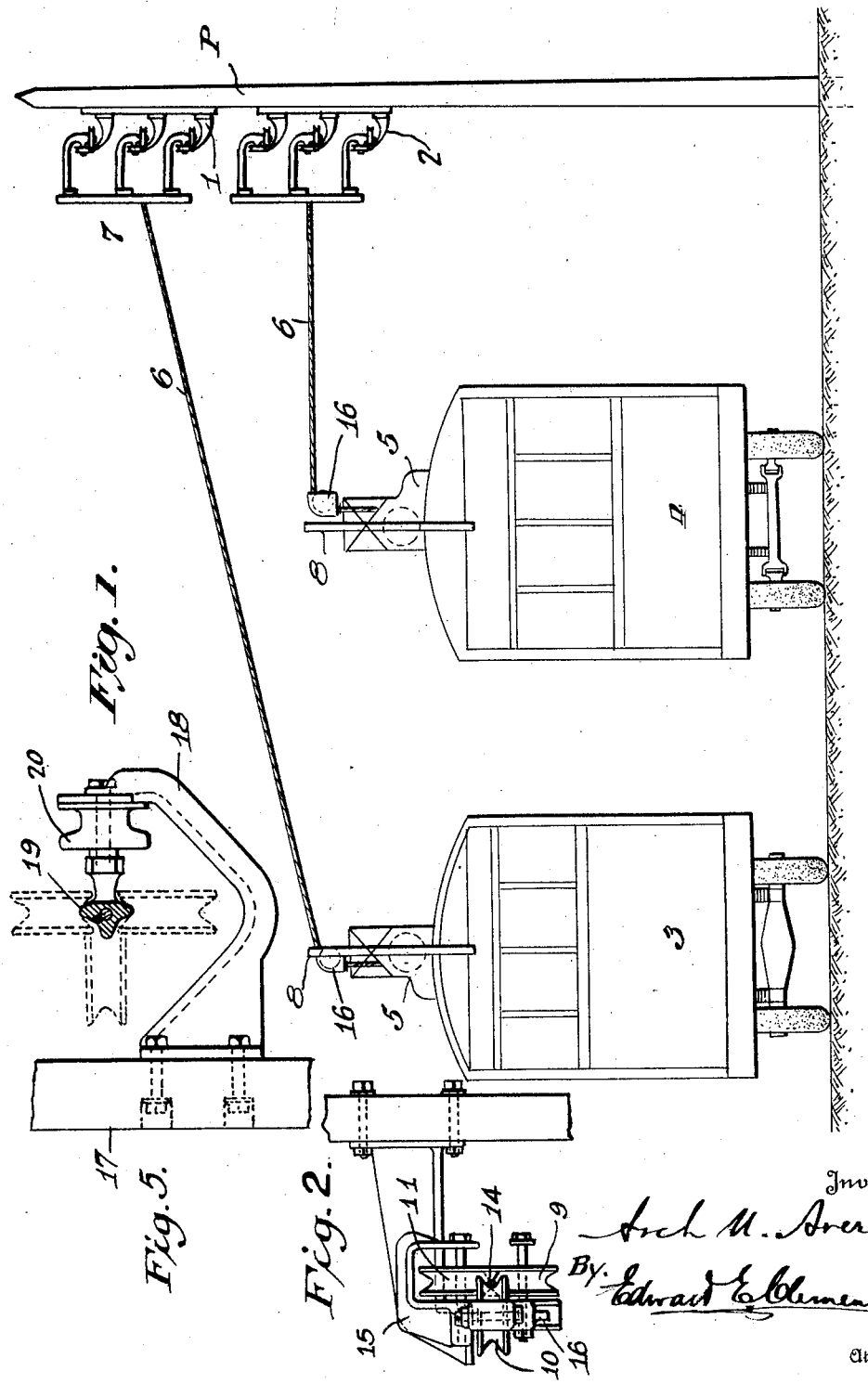

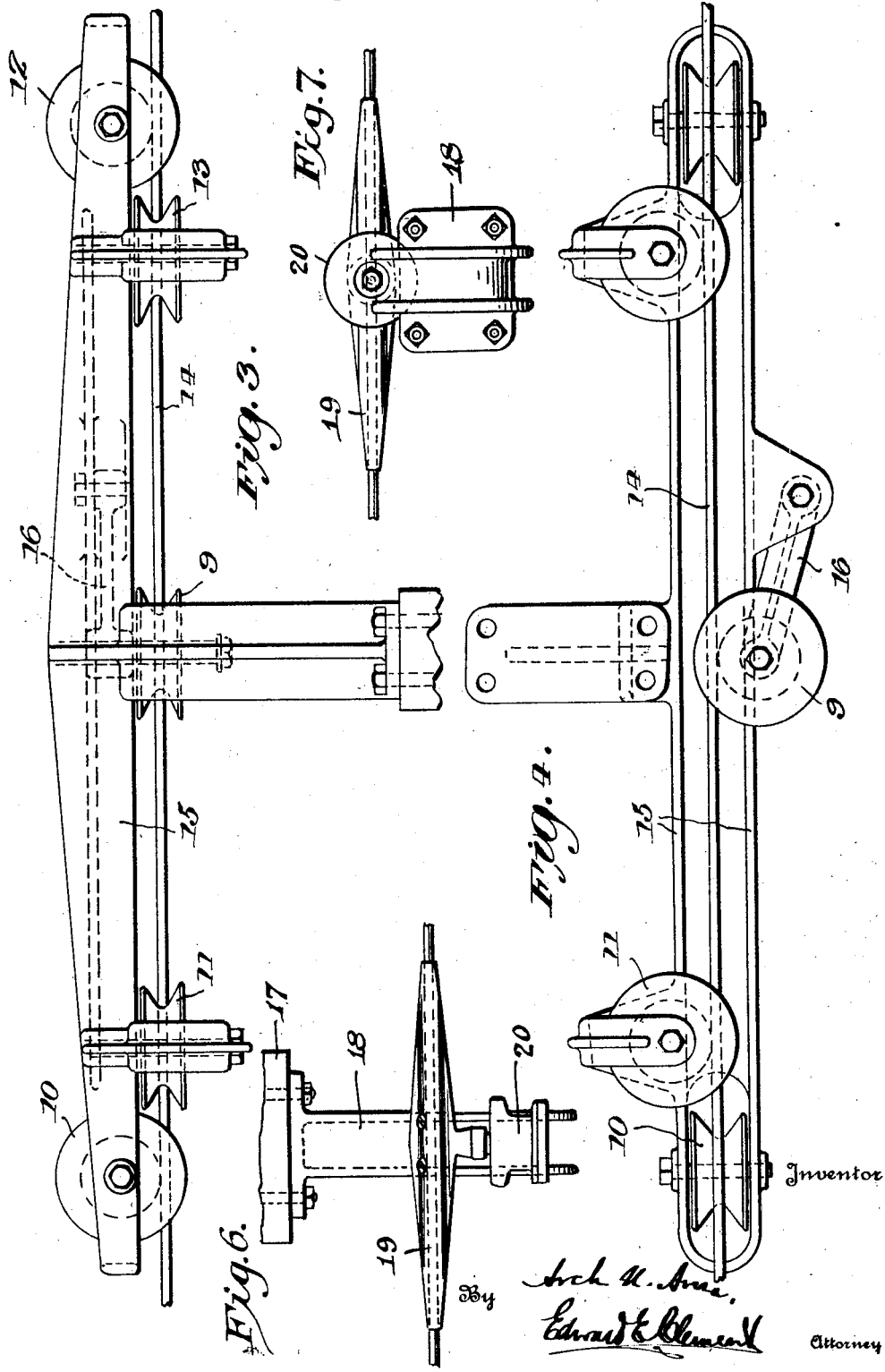

Patented Dec. 4, 1928.

1,693,914

UNITED STATES PATENT OFFICE.

ARCH UPSHAW AVERA, OF FLORENCE, ALABAMA.

TRANSMISSION OF POWER TO VEHICLES.

Original application filed July 13, 1922, Serial No. 574,724. Divided and this application filed May 24, 1923. Serial No. 641,102.

My invention relates to the transmission of power to vehicles and more particularly to current collectors therefor.

The main object of the invention is to provide a simple and reliable current collector especially adapted for use in the transmission of power from a trolley system to moving vehicles, such as cars, busses, canal boats and the like.

Other objects of the invention will be apparent from a perusual of the following specification and the drawings accompanying the same.

The present application is a division of my copending application Serial Number 574,724, filed July 13, 1922.

The invention is illustrated in the accompanying drawings in which:

Fig. 1 is a diagrammatic view showing the invention applied to the transmission of power to vehicles;

Figs. 2, 3 and 4 are enlarged detail views of a set of contact wheels;

Figs. 5, 6 and 7 are enlarged detail views of one of the trolley supports.

Referring to the drawings, and first to Fig. 1, the improved current collector is here shown applied to the transmission of power from a three conductor trolley system to road vehicles. The conductors are strung along one side of the roadway or canal, as the case may be, on trolley poles P in upper and lower sets 1 and 2, respectively. The vehicles are here shown as road trucks 3 and 4 (Fig. 1). Each vehicle carries a cable drum and motor housing 5, which contains within it, as indicated diagrammatically, a cable drum and motor arranged to exert a constant torque on the drum. A three-conductor cable 6 leads from the cable drum over a swivelled pulley to the trolley carriage 7 where the conductor strands of the cable connect through trolley contact wheels with the trolley wires. The trolley carriages are supported on and guided by the trolley wires so as to trail along with the vehicle, the upper set of trolley wires being raised sufficiently above the lower set to permit two vehicles to pass in opposite directions without interference of the cables, as indicated in Fig. 1. To further guard against interference of the cables, each vehicle is provided with a cable guard 8 in the form of an arc-shaped ramp mounted on the top of the vehicle. These guards are so arranged that the one on the vehicle nearest the trolley poles will guide the cable of the far vehicle over the cable and motor housing of the near vehicle, should there be any sag in the cable of the far vehicle.

Each trolley carriage is provided with three sets of trolley contact wheels. One of each set is shown in detail in Figs. 2, 3 and 4. As here shown, each set comprises five five wheels, 9, 10, 11, 12 and 13, respectively, mounted so as to bear on three sides of the trolley wire 14 and thus partly embrace the same, as shown in Fig. 2. All of the contact wheels except 9 are mounted on spindles fixed in the wheel frame 15, while the wheel 9 is mounted on a spring actuated arm 16 so as to resiliently bear upwardly against the trolley wire. The top wheels 11 and 13 are held in engagement with the trolley wire under the force of gravity aided by the tension of the lower wheel 9, while the side wheels 10 and 12 are held against the trolley wire by the cam action of the troughs of the top and bottom wheels bearing against the wire.

Each set of three trolley wires is mounted on the poles by means of a block 17, (Figs. 5 to 7), which carries a set of three trolley supports, each of which comprises, as shown in Figs. 5 to 7, a bracket arm 18 carrying a trolley holder 19 through the intermediation of an insulator 20, the trolley holder having a clover-shaped cross section as indicated in Fig. 5 which tapers down at each end to substantially the dimensions of the trolley wire as indicated in Figs. 6 and 7, so that the contact wheels may easily spread and ride thereover.

Having thus described my invention what I claim and desire to secure by Letters Patent is:—

1. The combination of an electrically driven vehicle adapted to travel on a fixed way, a stationary power supply line extending along one side of said way and including a trolley wire, a supporting structure therefor on the opposite side of the wire from said fixed way, and means for connecting the said structure to that side of the trolley wire which is next to the fixed way, a trolley element adapted to travel on said trolley wire, comprising a rigid frame on the outside of the trolley wire, an arm extending therefrom to the inside of the trolley wire so as to clear the supporting means thereof, and a plurality of grooved contacting wheels mounted on said arm adapted to engage the same trolley wire in planes lying at such angles with respect to each other as to embrace the same and be held thereby, together with a flexible cable mechanically connected with said frame and electrically connected with said trolley wheels and having its free end extending to the vehicle and mechanically and electrically connected thereto, so as to trail the trolley frame and trolley wheels along the trolley wire as the vehicle progresses along said fixed way.

2. The combination of an electrically driven vehicle adapted to travel on a fixed way, a stationary power supply line extending along said way and including a trolley wire, poles, and supporting brackets extending from said poles around said wire to engage the same on one side only, a vehicle adapted to travel on said fixed way, translating devices on said vehicle, a flexible cable mechanically connected to the vehicle and electrically connected to said translating devices, a trailer having a plurality of grooved contacting wheels adapted to engage said trolley wire on different sides so as to embrace the same and be held thereby, said trailer connected to the free end of said cable to transmit current there-through to the vehicle, and said trolley wheels resisting displacement from the trolley wire in every direction in which said cable tends to move them.

3. The combination with an electrically driven vehicle, of a stationary trolley power supply line, a flexible conducting cable carried by the vehicle, and a current collector member carried by said cable and adapted to travel on said line, comprising a plurality of grooved contacting wheels engaging a trolley wire on opposite and adjacent sides so as to embrace the same and be held thereby, the said supply line having a support arranged to embrace the same and said support being provided with guiding ribs for said grooved wheels extending from those sides of the wire engaged by the contacting wheels and tapered at the ends to approximately the diameter of the wire.

4. The combination of an electrically driven vehicle adapted to travel on a fixed way, a stationary power supply line extending along one side of said way and including a trolley wire and supporting poles therefor on the opposite side of the wire from said fixed way, a plurality of brackets carried on said poles, each extending around said wire to the side thereof next the vehicle way, and having combined clamping and guiding ribs engaging said wire longitudinally, and a flexible cable having one end mechanically attached to the vehicle and electrically connected to translating means thereon, a current collecting member electrically and mechanically connected to the other end of the cable, said current collecting member comprising a frame shaped to travel along and parallel with said trolley wire clear of said brackets and having a plurality of grooved contacting wheels engaging the same trolley wire in planes displaced from each other at such angles as to resist disengagement from the trolley wire by any movement of the cable or the vehicle.

5. The combination of an electrically driven vehicle adapted to travel on a fixed way, a stationary power supply line including a plurality of trolley conductors extending along one side of said way, a supporting structure on the side of said wires away from the fixed way, brackets on said structure extending around and engaging the respective trolley wires from the side next the fixed way, a trailer engaging each trolley wire on the free side thereof, and a rigid frame connected to said trailers to move them as one unit, together with a flexible cable extending from said rigid frame to the vehicle, each trailer carrying a plurality of grooved contacting wheels engaging the same trolley wire at such angles as to embrace the same and be held thereby.

6. The combination of an electrically driven vehicle adapted to travel on a fixed way, a stationary power supply line including a plurality of trolley conductors extending along one side of said way, a supporting structure on the side of said wires away from the fixed way, brackets on said structure extending around and engaging the respective trolley wires from the side next the fixed way, a trailer engaging each trolley wire on the free side thereof, and a rigid frame connected to said trailers to move them as one unit, together with a flexible cable extending from said rigid frame to the vehicle, and means for individually securing each trailer upon its own trolley wire so as to be held thereby and resist displacement therefrom.

In testimony whereof I hereunto affix my signature.

ARCH UPSHAW AVERA.